United States Patent [19]

Roach et al.

[11] 4,363,118
[45] Dec. 7, 1982

[54] SOUND CARRIER AMPLITUDE MEASUREMENT SYSTEM

[75] Inventors: William R. Roach, Rocky Hill; Istvan Gorog, Princeton, both of N.J.

[73] Assignee: RCA Corporation, New York, N.Y.

[21] Appl. No.: 189,355

[22] Filed: Sep. 22, 1980

[51] Int. Cl.³ .................... G11B 27/36; G01N 21/32
[52] U.S. Cl. ........................ 369/58; 369/18;
369/109; 369/54; 250/562; 250/572; 356/355;
356/237
[58] Field of Search ............. 369/18, 58, 109, 54;
358/127, 128.5, 128.6; 356/111, 237; 250/550,
562, 572

[56] References Cited

U.S. PATENT DOCUMENTS

| | | | |
|---|---|---|---|
| Re. 30,723 | 8/1981 | Heine | 369/18 |
| 1,916,973 | 7/1933 | Friebus | 369/18 |
| 3,842,194 | 10/1974 | Clemens | |
| 3,919,465 | 11/1975 | Adler et al. | 369/109 X |
| 4,044,379 | 8/1977 | Halter | |
| 4,155,098 | 5/1979 | Roach et al. | |
| 4,180,830 | 12/1979 | Roach | |

OTHER PUBLICATIONS

Roach et al., "Diffraction Spectrometry for VideoDisc Quality Control," RCA Review, vol. 39, Sep. 1978, pp. 472-511.

*Primary Examiner*—Raymond F. Cardillo
*Assistant Examiner*—Donald McElheny, Jr.
*Attorney, Agent, or Firm*—E. M. Whitacre; J. S. Tripoli; J. E. Roehling

[57] ABSTRACT

Apparatus provides an incident light beam which illuminates the surface of a grooved disc, having signal elements recorded therein in the form of a succession of spaced apart depressions, with a light spot that spans a plurality of convolutions of the groove. The structure of the groove convolutions and signal elements forms a two-dimensional diffraction grating which reflects light into a plurality of diffraction order beams. Photodetectors, respectively positioned to intercept several of the reflected beams provide outputs corresponding to the light power in the respective reflected beams. Estimations of signal element depth in the region illuminated by the light spot may be made from the measured light powers.

10 Claims, 5 Drawing Figures

SOUND CARRIER AMPLITUDE MEASUREMENT SYSTEM

The present invention relates generally to optical detection systems and, more particularly, to optical detection systems which may be employed to provide an estimation of signal depression depth in a regularly tracked surface having a pattern of signal depressions formed along the length of the track, such as a video disc of the type described in U.S. Pat. No. 3,842,194 issued to Jon K. Clemens.

BACKGROUND OF THE INVENTION

The depth estimation principles of the present invention are illustratively applicable and will be described with reference to optical inspection of spiral grooves for video disc records at various manufacturing stages throughout the record mastering and replicating processes, particularly after the formation of an information track, having signal elements in the form of spaced apart depressions in the groove.

In certain high density information record/playback systems, video information is recorded as relatively short wavelength (e.g., 0.6–1.6 $\mu$m) reflectivity, transmission or relief variations along the length of an information track. Illustratively, the method of recording may be of the type shown in U.S. Pat. No. 4,044,379, issued to J. B. Halter. Pursuant to the Halter method, an electromechanically driven stylus (e.g., of diamond) responsive to a video and audio signal, records the relatively short geometric variations representative of the time variations of the signal to be recorded in a metal master. After the electromechanical recording operation, the metal master has a relief pattern corresponding to that which is desired in the final record. Stampers which are used to produce production line records are made from the master and a vinyl substrate is formed, having the desired relief pattern, from the stamper.

In one illustrative format for electromechanical cutting disclosed in the Halter patent, a composite video signal is additively combined with the accompanying audio signal. In accordance with this method the accompanying audio signal is caused to frequency modulate a low frequency sound carrier over a low frequency deviation range (illustratively, 716±50 KHz). In a picture modulator, the composite color video signal (including luminance signals occupying a given band of frequencies and chrominance signals appearing as sideband components of a modulated chrominance subcarrier interleaved with luminance signal components in an intermediate region of the given band) is caused to frequency modulate a high frequency picture carrier over a high frequency deviation range (illustratively, 4.3–6.3 MHz). The peak-to-peak amplitude of the sound modulator output is held at a level which is small relative to the peak-to-peak amplitude level of the picture modulator output, with an illustrative level ratio being 1:10. The respective modulated carriers are combined in a linear adder and applied to a recorder which may be a Halter electromechanical recorder controlled in response to the signal developed by the adder. The recorder is used to record the composite signal on the metal master.

The specification of the sound carrier recorded on a video disc is generally critical to the performance of the video disc system. The peak-to-peak amplitude of the sound carrier recorded on a high density information record, such as the Clemens video disc, is very small-illustratively, the sound carrier amplitude may be 85 Å peak-to-peak. Deviation of the amplitude of the sound carrier from that which is specified may adversely affect the quality of the video and audio reproduction. For example, if the sound carrier is not cut deep enough the signal-to-noise ratio may be degraded or, on the other hand, if it is cut too deep sound beats may be visible during the video reproduction.

To provide high quality video and audio reproduction during disc playback a measurement of the amplitude of the sound carrier should be performed prior to the recording process to determine the depth of cut. In one prior art technique a scanning electron microscope (SEM) is used to measure the sound carrier depth. A thin stamper is made from the metal master. Samples which are prepared from the stamper are analyzed in the SEM to determine the depth of the recorded signal elements. To measure the depth of shallow (e.g., less than 200 Å) and long wavelength (e.g., approximately 10 $\mu$m) signal elements, such as those recorded in a Clemens disc, several measurements must be made to obtain a marginally accurate estimate of the sound signal depth. This technique is not completely satisfactory. A delay of several hours is introduced between the recording operation and the measurement; the SEM measuring process is very tedious; and the measurement is not always as accurate as desired.

In another prior art technique an optical video disc player is used to estimate the sound carrier amplitude. In accordance with this method the ratio of the detected signal at the audio frequency to that of the video frequency is measured during laser playback; thus with the knowledge of the video signal depth the audio signal depth can be determined from the ratio. This prior art technique, however, has not been satisfactory. The ratio of the video to sound is sensitive to other variables, such as focus of the laser player; therefore, it is difficult to rely on the accuracy of the results.

SUMMARY OF THE INVENTION

In accordance with the principles of the present invention a fast and accurate method for determining signal depression depth (illustratively, sound signal depression depth) that is based on measuring and analyzing the diffraction pattern which is produced by illuminating a relatively large area of a master surface is provided.

Further, in accordance with the principles of the present invention a depth measuring apparatus for use with a disc-shaped substrate having an information track, such as a spiral groove, formed on a surface thereof is provided. Signal information is recorded in the spiral groove as vertical undulations in the groove bottom which vary about a given nominal groove depth, the peak-to-peak variation of the undulations being small compared to the given nominal depth. The apparatus comprises means for illuminating a region of the groove disc surface with a light beam of a given wavelength, the light beam being incident on the disc surface at a non-normal angle. The illuminated region is sufficiently large to span a plurality of groove convolutions. The structure of the grooves and undulations in the illuminated region serves as a two-dimensional diffraction grating for diffracting light reflected from the illuminated region to form a diffraction pattern comprising respectively separated diffraction order beams of light. The apparatus further includes means for detecting the light power in each of a plurality of the diffraction order beams and means, coupled to the detecting means, for indicating a measure of the detected light powers. A movable frame member is provided for positioning the detecting means in a first position to measure the light powers in a first set of diffraction order beams of light and in a second position to measure the light powers in a second set of diffraction order beams of light. The measurement at the first position provides a first estimate of the peak-to-peak variation of the undulations and the measurement at the second position provides a second estimate. Thus the two measurements provide an internal consistency check.

In accordance with one aspect of the present invention the detecting means comprises a photosensitive device for scanning the respective sets of diffraction order beams. In accordance with this aspect a variable gain device is interposed between the detecting means and the indicating means to compensate for a substantial difference in the light powers between first and second beams of light in the respective sets of diffraction order beams.

In accordance with another aspect of the present invention the detecting means comprises a set of fixed photosensitive devices. A first photosensitive device is arranged to detect the light power in a zero order diffraction beam of the respectively separated diffraction order beams of light. A pair of second photosensitive devices are arranged to detect the light power in plus and minus first order diffraction beams of the respectively separated diffraction order beams of light. Additionally, a plurality of third photosensitive devices is arranged to detect the light power in the background noise of said first order diffraction beams.

BRIEF DESCRIPTION OF THE DRAWING

Other features and advantages of the invention will be more fully understood from the following detailed description of the preferred embodiment, the appended claims, and the accompanying drawing in which:

DESCRIPTION OF THE PREFERRED EMBODIMENT

Figure 1:
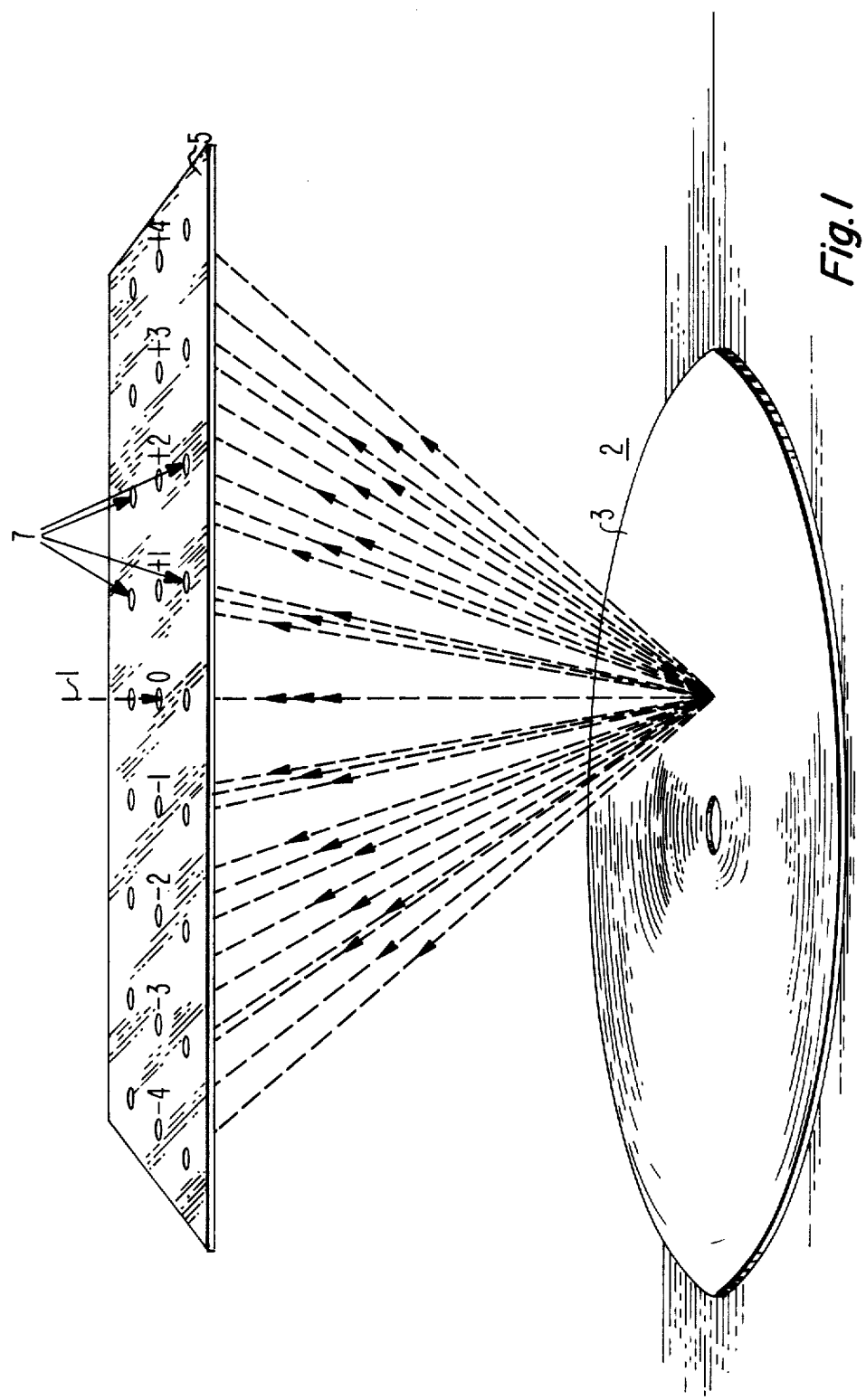
FIG. 1 shows a diffraction pattern produced by a grooved video disc surface having signal elements recorded in the grooves.

Referring to FIG. 1, a laser beam 1 is provided at disc 2 normal to the disc surface 3. A spiral groove (illustratively, 140° "V" shaped groove with a substantially constant pitch, for example, 9,500 grooves/inch producing an approximately 0.5 $\mu$m groove depth) is cut on disc surface 3. Signal elements are recorded across the groove as relatively short geometric variations (illustratively, signals having a peak-to-peak depth of 85 Å recorded at an audio carrier frequency of approximately 716 KHz at a radius of 6 inches on a disc surface spinning at 450 rpm result in a 10 $\mu$m wavelength along the groove elongation) forming a diffraction grating on disc surface 3. Illustratively, if the audio carrier frequency is an exact multiple of the rotation frequency, i.e., the audio carrier is radially aligned in adjacent grooves, the grooves and signal elements form a crossed (e.g., two-dimensional) grating that diffracts light into two orthogonal directions.

Light beam 1 which is incident on disc surface 3 is weakly focused such that the spot size on the disc surface is much larger than the groove width; thus several convolutions of the groove are illuminated simultaneously. The two-dimensional diffraction grating, i.e., groove and signal elements, diffract the light reflected off of the disc surface 3 into a well-defined diffraction pattern above the surface 3. A viewing screen 5 positioned above the disc surface provides a display of the spots of the diffraction order beams. For normal laser incidence, the groove order spots $-4, -3, -2, -1, 0, +1, +2, +3,$ and $+4$ (i.e., zero signal order spots) are shown along with the plus and minus first signal order spots 7 on either side thereof. For a 140°, 9,500 grooves-/inch triangular groove profile the $\pm 2$ and $\pm 3$ groove orders are much stronger than the 0, $\pm 1$, and $\pm 4$ but they come off of the disc surface at angles of 28.3 degrees and 45.4 degrees to the normal.

The plus and minus first signal diffraction spots, reflected from a grooved surface having shallow, long wavelength signal elements, may be very weak (illustratively, they may be 500 times less intense than the zero signal diffraction spots) and are diffracted through a relatively small angle (illustratively, 3.6 degrees from the normal). For these reasons it is difficult to sort out the plus and minus first order diffraction from the strong background of the zero diffraction; in fact, unless a photodetector, used to measure the intensity of the various diffraction beams, is precisely positioned the background of the zero diffraction adversely affects the measurement. To make matters even worse, if the signal elements are not aligned radially on the disc surface the diffraction pattern is not a set of distinct spots as shown in FIG. 1 but the plus and minus first order spots are smeared and displaced in a radial direction.

Figure 2:
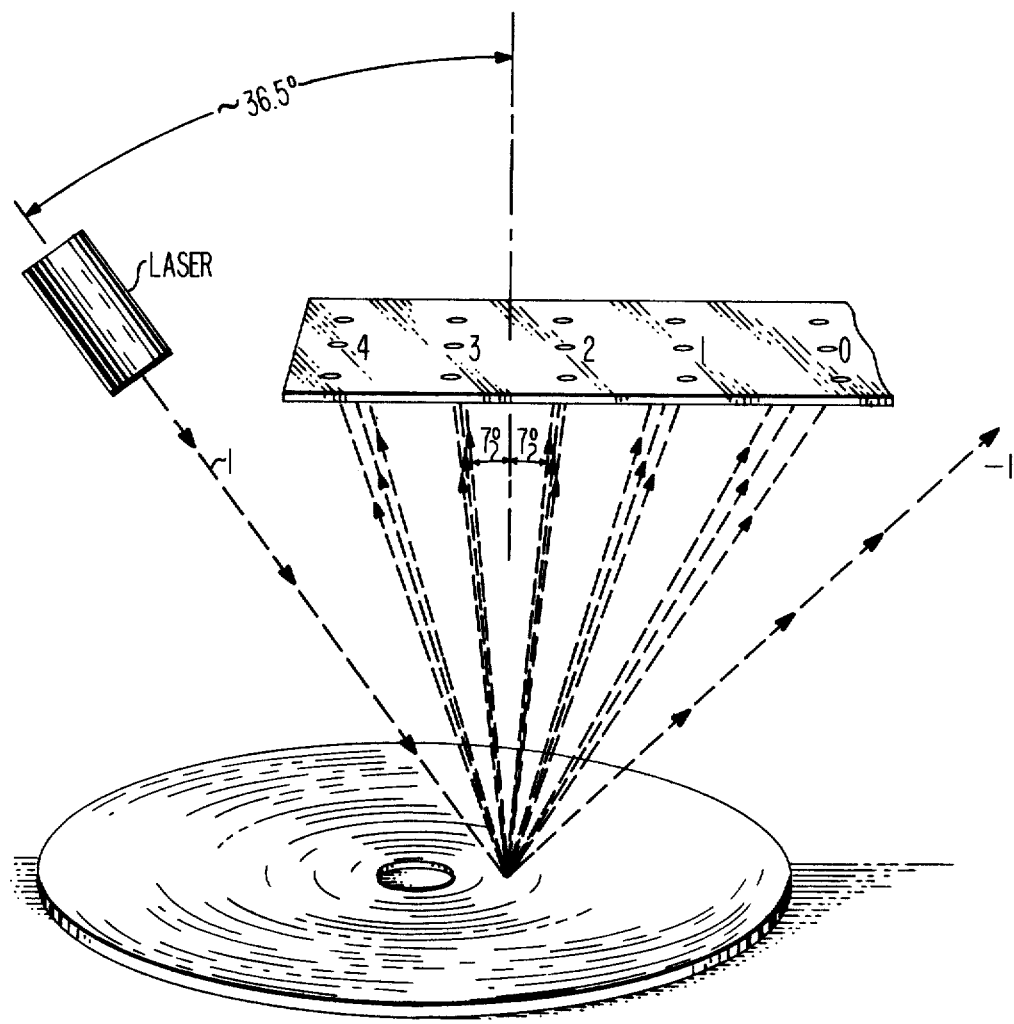
FIG. 2 shows a diffraction pattern produced by illuminating the surface of a grooved disc in a non-normal direction.

Referring to FIG. 2, these problems may be reduced. First of all, test bands may be provided on the disc surface. In the test bands, the signal carrier is locked to the turntable rotation such that the signal elements are radially aligned on the disc surface; thus effecting a diffraction into distinct, orthogonal spots. Secondly, the substrate surface may be illuminated with a laser beam 1 at a non-normal angle of incidence to provide a multiplicity of diffraction order beams which are accessible for measurement. Illustratively, an angle of 36.5 degrees of incidence effects a diffraction such that the strong second and third groove orders are distributed to each side of the normal by $\pm 7$ degrees.

Figure 3:
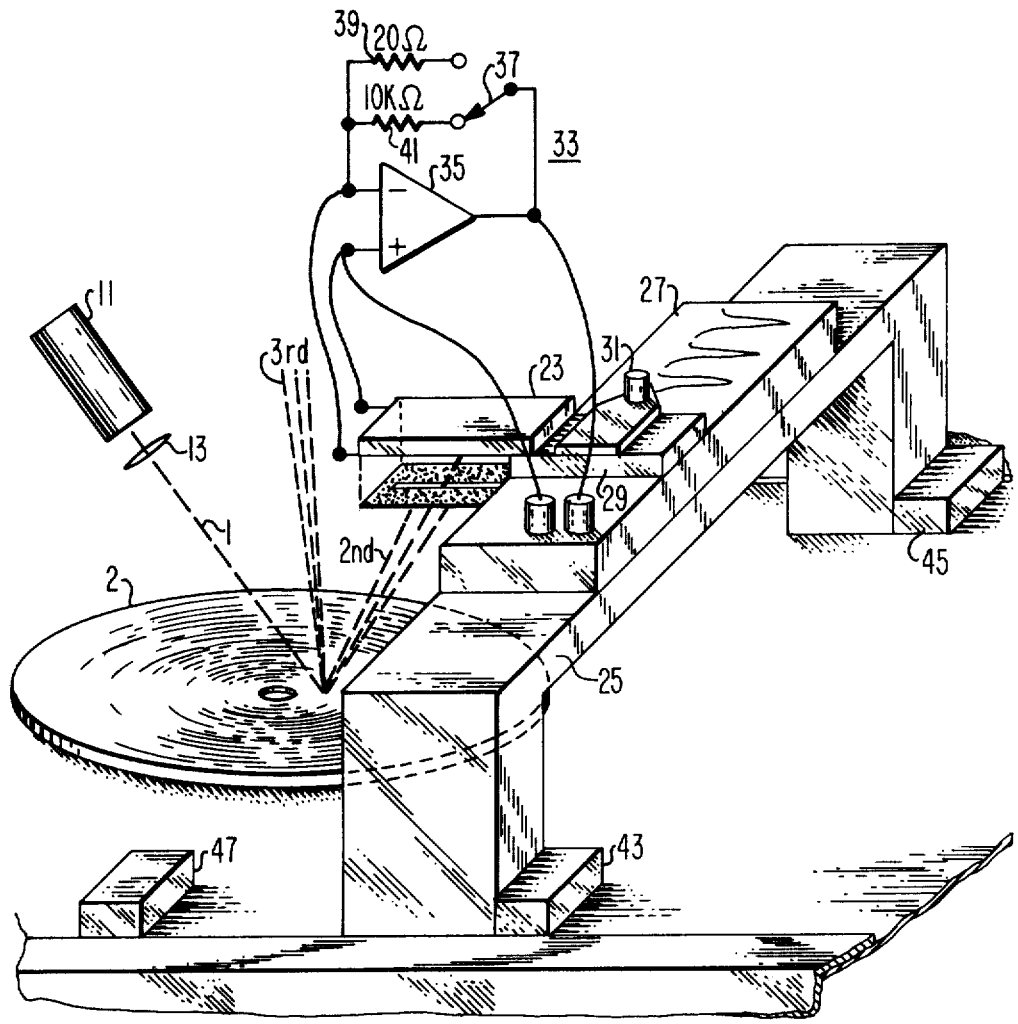
FIG. 3 shows, in a perspective view, an apparatus forming a portion of a depth estimation system embodying the principles of the present invention.

Referring to FIG. 3, a coherent light beam 1 from a light source 11 (illustratively, in the form of a helium-neon laser) is focused by lens 13 toward a focus point on the surface of grooved disc 2. The focused beam illuminates the grooved surface with a light spot having a half-intensity contour that spans a plurality of groove convolutions. In order that the respective diffraction order beams may be conveniently measured, the orientation of the incident beam is desirably such that the axis of the incident beam lies at an angle of approximately 36.5 degrees to the disc normal and in a radial plane which is perpendicular to the disc surface. This orientation will make the second and third groove orders accessible for measurement.

A photodetector 23 is positioned on platform 25 so that its photosensitive surface (illustratively, having a rectangular aperture of approximately 1.5 mm by 2.5 cm positioned approximately 10 cm above surface 2) is successively brought in registry with the path of the diffraction order beams of light. The photodetector is translated along a plane which is parallel to the illuminated disc surface.

Advantageously, photodetector 23 is combined with an xy-plotter 27 to provide a hard copy of the relative light powers in the respective diffraction orders intercepted by the photodetector 23. By mounting photodetector 23 on a slide 29 of the xy-plotter, the position of the photodetector 23, as it is tangentially translated, is readily indicated on one axis of the plotter. The output of the photodetector which is a measure of the light power incident thereon is applied to a drive circuit 33 for a writing pen 31 whose longitudinal position along slide 29 is made to correspond to the magnitude of the output of the photodetector. Therefore, the xy-plotter traces on an appropriate medium a record of the relative light power intercepted by the photodetector as a function of the photodetector position.

The peak-to-peak signal carrier is so shallow that only a small fraction of the incident beam will be diffracted into the ± first order signal carrier beams. Illustratively, for an 85 Å deep audio signal carrier the ratio of the light power in the plus (or minus) first order audio signal diffraction beam to that in the corresponding zero audio signal order beam is 1:446. A method of collecting the zero order as well as the plus and minus first order data incorporates a dual gain drive circuit. Drive circuit 33 includes current-to-voltage converter 35. A switch 37 is positioned to select feedback resistors 39 or 41 having a 1:500 ratio. In this embodiment, as the detector is scanned over the wings to measure ± first order intensity resistor 41 is switched into the drive circuit and when in the vicinity of the central peak, i.e., the zero order, resistor 39 is used.

To enhance the credibility of the estimations an internal consistency check is provided. Platform 25 can be positioned against stops 43 and 45 to collect the light from the second groove order reflected light or against stops 47 and 49 (not shown) to collect the light from the third groove order reflected light.

The sound carrier amplitude measurement system is provided with a detector arrangement and inspection beam orientation such that one may make the internal consistency check and measure the intensity of the defracted beams of light easily. With the arrangement of FIG. 3 the inspection beam is oriented at 36.5° to the disc normal. With this orientation the second and third order beams may be measured by a detector which has its light sensitive surface positioned in a plane parallel to the plane of the disc. In this manner the internal consistency check, that is, two measurements, may be made without changing the orientation of the photodetector between the first measurement and the second. On the other hand, if another angle were chosen it is likely that the photodetector surface would have to be skewed with respect to the disc surface to make both measurements. Thus, the platform 25 would not only have to move laterally but photodetector 23 would also have to be reoriented in an angular sense to collect the light from both groove orders. In the present arrangement platform 25 having photodetector 23 horizontally oriented may be shifted from one set of stops (e.g., 43 and 45) to the other set of stops (e.g., 47 and 49) to collect the light in both groove orders.

Figure 4:
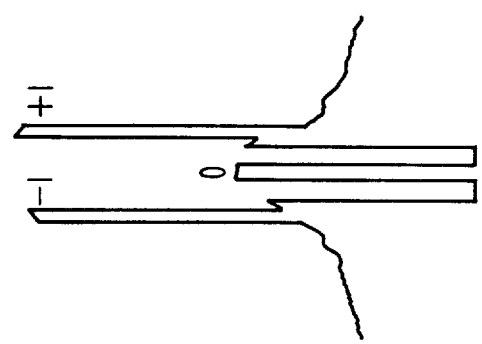
FIG. 4 shows a signal diffraction pattern produced by illuminating a video disc in accordance with the principles of the present invention.

In FIG. 4, a representative pattern of interference maxima and minima produced by illuminating a plurality of groove convolutions with a coherent light beam is shown in a format produced by the xy-plotter of FIG. 3. Notice the symmetry of the illustrated peaks about the zero diffraction peak which is typical of case when the signal is locked to the turntable rotational period during the mastering operation providing radially aligned signal elements. If there is a slippage of the signal carrier with respect to a radius on the substrate (i.e., a constant phase shift groove to groove) then the diffraction pattern becomes skewed and it is no longer possible to unambiguously determine what portion of the signal spectrum should be associated with what groove order in general; the xy-plot would not be symmetrical for this case.

Figure 5:
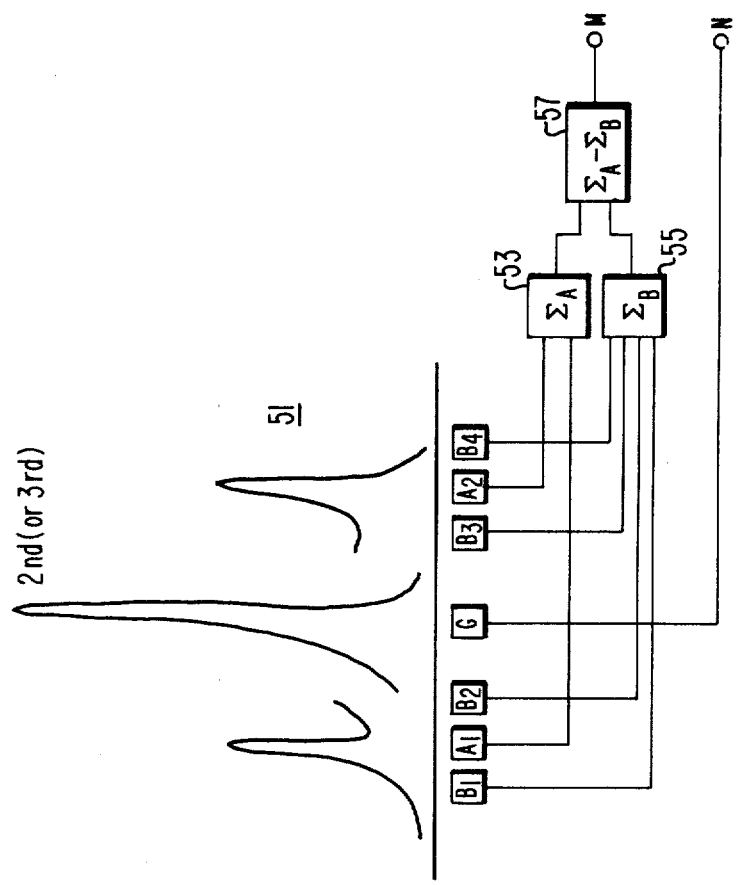
FIG. 5 shows a detector array for detecting the light powers in the respective diffraction order beams in accordance with one aspect of the present invention.

Referring to FIG. 5, a fixed detector array for measuring the light spectrum 51 from a selected groove order, e.g., second or third groove order, is shown. In this embodiment, detector G is arranged to detect the light power in the zero signal order; detectors A1 and A2 are arranged to detect the light power in the ±1 signal orders; and detectors B1, B2, B3 and B4 are positioned to detect the background noise around the ±1 signal orders. A first signal at terminal N provides the light power detected by light detector G and a second signal at terminal M provides the combined light power of the signal diffraction orders. The analog circuitry used to arrive at the signal at terminal M includes summer 53 which is used to combine the signal output from detectors A1 and A2, summer 55 which is used to combine the output signals from light detectors B1, B2, B3 and B4, and combiner 57 which is used to take the difference of the output signals from summers 53 and 55.

To explain the diffraction of laser light from a regularly grooved disc surface, such as a disc of the Clemens type where signal elements in adjacent grooves are radially aligned, the grooves and signal elements may be considered as forming a crossed orthogonal diffraction grating. The local phase modulation produced by such a grating is:

$$\phi(r,z)=\phi(r)+\phi(z)$$

Here $\phi(r)$ is periodic in a radial direction with a period equal to the groove width and $\phi(z)$ is periodic in a tangential direction with a period equal to the audio signal period. For this special case the scalar diffraction theory indicates that the power distribution in the diffraction pattern is of the form:

$$P(\theta_r,\theta_z)=p(\theta_r)p(\theta_z)$$

where $\theta_r$ is the diffraction angle from the disc normal in the radial plane and $\theta_z$ is the diffraction angle from the disc normal in a tangential plane. Because the diffraction pattern is of this form the two diffraction processes may be considered to be independent. Thus, to explain any feature of diffraction due to signals any single groove order in the radial plane may be considered as a "zero signal order" beam and then utilizing the scaler one-dimensional diffraction theory the distribution of light between this "zero signal order" and "higher signal order" beams corresponds to the light power in the groove order selected.

It will be appreciated that for a uniform infinite wave front the light power at the nth maximum of the diffraction spectrum of a one-dimensional phase grating is given by:

$$P = K \left| \int_0^l e^{i(\phi(z) - \frac{2\pi nz}{T})} dz \right|^2,$$

where $\phi(z)$ is the phase retardation introduced at position z in a signal and the integration in z is over l, the length of a single signal element and K is a constant. In the case of a sinusoidal reflection grating:

$$\phi(z) = \Delta \sin (2\pi z/l),$$

where $\Delta$ is the peak-to-peak optical depth of the grating in radians. The light power in nth order reflected beams (i.e., $P_{-n}$, $P_{+n}$) becomes:

$$P_n = K \left| \int_0^l e^{i(\Delta \sin \frac{2\pi z}{T} - \frac{2\pi nz}{T})} dz \right|^2.$$

which for a signal element having a sinusoidal cross section reduces to:

$$P_n = [J_n(\Delta)]^2,$$

where $J_n(\Delta)$ is the Bessel function of order n and argument $\Delta$.

For a sinusoidal signal the argument $\Delta$ is simply:

$$\Delta = (2\pi/\lambda)d,$$

where d is the depth of the signal and $\lambda$ is the incident beam wavelength.

Furthermore, the recursion relation which exists between the Bessel functions can be expressed as:

$$\Delta = \frac{2nJ_n(\Delta)}{J_{n-1}(\Delta) + J_{n+1}(\Delta)}$$

and for $J_{n-1}$, $J_n$ and $J_{n+1} > 0$, $\Delta$ can be expressed in terms of light power in the respective nth order reflected beams:

$$\Delta = \frac{2n\sqrt{P_n}}{\sqrt{P_{n-1}} + \sqrt{P_{n+1}}}$$

The audio signal depth, therefore, may be written as:

$$d = \frac{\lambda}{\pi} \frac{\sqrt{P_1}}{\sqrt{P_o} + \sqrt{P_2}}$$

The power in the second order audio diffraction approaches zero, therefore, the audio depth may be written as:

$$d = \frac{\lambda}{\pi} \frac{\sqrt{P_1}}{\sqrt{P_o}}$$

From the aforementioned expression a calculation of the audio signal depth may be made from the measured value of the power in the zero order signal diffraction beam, $P_o$, and the power in the plus or minus first order signal diffraction beams, $P_1$.

What is claimed is:

1. Depth measuring apparatus for use with a disc-shaped substrate having a spiral groove formed on a surface thereof, wherein signal information is recorded in said spiral groove as undulations which vary about a given nominal groove depth, said signal information being recorded in said groove over first and second given frequency ranges, said signal information recorded over said first given frequency range being recorded over a low frequency range and said information recorded over said second given frequency range being recorded over a high frequency range, the peak-to-peak variation of said undulations over said first given frequency range being less than the peak-to-peak variations of said undulations over said second given frequency range, said signal information recorded over said first given frequency range being recorded in a spiral groove in a test band to the exclusion of said signal information recorded over said second frequency range, said signal information being recorded in said test band such that signal elements in adjacent convolutions of the spiral are radially aligned; said apparatus comprising:

means for illuminating a region of said test bands of the grooved disc surface with a light beam of a given wavelength, said light beam being incident on said surface at a nonnormal angle, the illuminated region being sufficiently large to span a plurality of groove convolutions, the structure of the grooves and radially aligned undulations in said illuminated region serving as a two-dimensional diffraction grating for diffracting light reflected from said illuminated region to form a diffraction pattern comprising respectively separated diffraction order beams of light;

means for detecting the light power in each of a plurality of said diffraction order beams; said means for detecting having a light accepting surface;

means coupled to said detecting means, for indicating a measure of said detected light powers; and movable frame member, supporting said detecting means, for positioning said detecting means in a first position to measure the light powers in a first set of diffraction order beams of light and in a second position to measure the light powers in a second set of diffraction order beams of light whereby the measurement in said first position provides a first estimate of the peak-to-peak variations of said undulations over said first given frequency range and the measurement in said second position provides a second estimate, and an internal consistency check, of the peak-to-peak variations of said undulations over said first given frequency range.

2. The depth measuring apparatus according to claim 1 wherein the angle of incidence that said illuminating light beam makes with said disc surface is approximately equal to 36.5° such that diffraction order beams of comparable intensity are symmetrically disposed about a disc normal, and wherein said light accepting surface of said detecting means is arranged parallel to said surface of said disc shaped substrate.

3. The depth measuring apparatus according to claim 2 wherein said detecting means has a rectangular aperture of a given width and a given length for limiting the amount of light detected thereby; said width of said aperture being chosen to allow measurement of low intensity diffraction order beams without undue influence from the background of a high intensity diffraction order beam.

4. The depth measuring apparatus according to claim 3 wherein said aperture collects the light in a bundle of rays reflected from said disc surface in a region bounded by an aperture of width of less than 1.5 millimeters and of length of approximately 2.5 centimeters in a flat plane parallel to said disc surface and positioned 10 centimeters from said disc surface.

5. The depth measuring apparatus according to claim 4 wherein said signal information in said first given frequency range comprises an audio signal carrier.

6. The depth measuring apparatus according to claim 1 wherein said detecting means comprises:
- a first photosensitive device for detecting the light power in a zero order diffraction beam of said respectively separated diffraction order beams of light;
- a pair of second photosensitive devices for detecting the light power in plus and minus first order diffraction beams of said respectively separated diffraction order beams of light; and
- a plurality of third photosensitive devices for detecting the light power in the background noise of said first order diffraction beams.

7. The depth measuring apparatus according to claim 6 further comprising:
- a first means for additively combining the output signals from said pair of second photosensitive devices;
- a second means for additively combining the output signals from said plurality of third photosensitive devices; and
- a third means for subtractively combining the output signals of said first combining means with the output signal of said second combining means;
- whereby the square root of the ratio of the output signal from said third combining means to said output signal from said first photosensitive device is proportional to the peak-to-peak variation of the undulations.

8. The depth measuring apparatus according to claim 7 wherein the angle of incidence that said illuminating light beam makes with said disc surface is approximately equal to 36.5° such that diffraction order beams of comparable intensity are symmetrically disposed about a disc normal, and wherein said light accepting surface of said detecting means is arranged parallel to said surface of said disc shaped substrate.

9. The depth measuring apparatus according to claim 8 wherein said signal information in said first given frequency range comprises an audio signal carrier.

10. A method for estimating, in a disc shaped substrate having a spiral groove formed on a surface thereof, wherein signal information is recorded in said spiral groove as undulations which vary about a given nominal groove depth, the peak-to-peak variation of said undulations, said method comprising the steps of:
- forming undulations of a given frequency in a spiral groove in a test band on said surface of said substrate, said undulations in said test band being formed such that undulations in adjacent convolutions in said test band are radially aligned;
- illuminating a region of the test band in said grooved disc surface with a light beam of a given wavelength, the illuminated region being sufficiently large to span a plurality of groove convolutions, the structure of the grooves and undulations in said illuminated region serving as a two dimensional diffraction grating for diffracting light reflected from said illuminated region to form a diffraction pattern comprising a zero order diffraction spray, lying in a plane which is perpendicular to said substrate and includes a radius of said disc, and a pair of first order diffraction sprays equally disposed about said zero order spray, said zero order diffraction spray including a plurality of second distinct diffraction beams, each of said plurality of first distinct diffraction beams corresponding to a pair of said plurality of second distinct diffraction beams;
- arranging said light beam of said given wavelength such that the angle of incidence which said light beam makes with said grooved disc surface affects said diffraction pattern such that at least two of said plurality of first distinct diffraction beams are diffracted from said illuminated region at substantially equal angles to a plane normal to said surface;
- measuring the light powers of said at least two of said first distinct diffraction beams and second distinct diffraction beams corresponding to said at least two of said first distinct diffraction beams;
- determining a first estimate of the peak-to-peak variations of said undulations from one of said at least two of said first distinct diffraction beams;
- determining a second estimate of the peak-to-peak variations of said undulations from another of said at least two of said first distinct diffraction beams; and
- comparing said first estimate to said second estimate to provide a check of the accuracy of the measured values;
- whereby said determining steps provide an estimation of the peak-to-peak variation of said undulations.

* * * * *